US012100915B2

(12) United States Patent
Droesbeke et al.

(10) Patent No.: US 12,100,915 B2
(45) Date of Patent: Sep. 24, 2024

(54) SHIELDED ELECTRICAL CONNECTOR FOR AUTOMOTIVE APPLICATIONS AND METHOD OF ASSEMBLING THEREOF

(71) Applicant: Aptiv Technologies AG, Schaffhausen (CH)

(72) Inventors: Gert Droesbeke, Erkrath (DE); Tristan de Blieck Roland, Oss (NL); Srinivasan Manoharan, Chennai (IN)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 18/137,708

(22) Filed: Apr. 21, 2023

(65) Prior Publication Data

US 2023/0335956 A1 Oct. 19, 2023

Related U.S. Application Data

(63) Continuation of application No. 16/998,188, filed on Aug. 20, 2020, now Pat. No. 11,637,405.

(30) Foreign Application Priority Data

Aug. 20, 2019 (EP) .................................... 19192622

(51) Int. Cl.
*H01R 13/6593* (2011.01)
*H01R 43/02* (2006.01)
(Continued)

(52) U.S. Cl.
CPC ..... *H01R 13/6593* (2013.01); *H01R 43/0221* (2013.01); *H01R 43/04* (2013.01);
(Continued)

(58) Field of Classification Search
CPC ....................... H01R 13/6593; H01R 43/0221; H01R 43/04; H01R 4/10; H01R 4/18;
(Continued)

(56) References Cited

U.S. PATENT DOCUMENTS 3,245,027 A 4/1966 Ziegler
3,717,842 A * 2/1973 Douglas, Jr. ............ H01R 4/62 228/1.1

(Continued)

FOREIGN PATENT DOCUMENTS

CN 106169667 A 11/2016
CN 107946823 A 4/2018

(Continued)

OTHER PUBLICATIONS

CN Office Action; Application No. 202010837071.2; mailed May 24, 2022.

(Continued)

*Primary Examiner* — Justin M Kratt
(74) *Attorney, Agent, or Firm* — Billion & Armitage

(57) ABSTRACT

A method of assembling a connector for automotive applications, comprising the steps of: providing a cable having at least one inner conductor; connecting an elongated inner signal contact of the connector to a stripped end of the at least one inner conductor; surrounding the elongated inner signal contact by an insulating element; placing a first shielding part of the connector around a first portion of the insulating element from a first radial direction; placing a second shielding part of the connector around a second portion of the insulating element from a second radial direction generally opposite to the first radial direction; and joining the first and second shielding parts to form a shielding contact of the connector surrounding the insulating element.

5 Claims, 15 Drawing Sheets

(51) Int. Cl.

| | |
|---|---|
| ***H01R 43/04*** | (2006.01) |
| *H01R 4/10* | (2006.01) |
| *H01R 4/18* | (2006.01) |
| *H01R 9/05* | (2006.01) |
| *H01R 11/11* | (2006.01) |
| *H01R 13/40* | (2006.01) |
| *H01R 13/42* | (2006.01) |
| *H01R 13/422* | (2006.01) |
| *H01R 13/428* | (2006.01) |
| *H01R 13/506* | (2006.01) |
| *H01R 13/6581* | (2011.01) |
| *H01R 13/6591* | (2011.01) |
| *H01R 13/6592* | (2011.01) |
| *H01R 43/20* | (2006.01) |

(52) U.S. Cl.
CPC .................. *H01R 4/10* (2013.01); *H01R 4/18* (2013.01); *H01R 4/184* (2013.01); *H01R 4/185* (2013.01); *H01R 4/186* (2013.01); *H01R 4/187* (2013.01); *H01R 9/05* (2013.01); *H01R 9/0518* (2013.01); *H01R 11/11* (2013.01); *H01R 13/40* (2013.01); *H01R 13/42* (2013.01); *H01R 13/422* (2013.01); *H01R 13/4223* (2013.01); *H01R 13/428* (2013.01); *H01R 13/506* (2013.01); *H01R 13/6581* (2013.01); *H01R 13/6591* (2013.01); *H01R 13/6592* (2013.01); *H01R 43/02* (2013.01); *H01R 43/20* (2013.01)

(58) Field of Classification Search
CPC ........ H01R 4/184; H01R 4/185; H01R 4/186; H01R 4/187; H01R 9/05; H01R 9/0518; H01R 11/11; H01R 13/40; H01R 13/42; H01R 13/422; H01R 13/4223; H01R 13/428; H01R 13/506; H01R 13/6581; H01R 13/6591; H01R 13/6592; H01R 43/02; H01R 43/20
See application file for complete search history.

(56) References Cited

U.S. PATENT DOCUMENTS

| | | | | |
|---|---|---|---|---|
| 10,297,932 | B2 | 5/2019 | Maesoba et al. | |
| 2013/0052866 | A1* | 2/2013 | Ii ........................ | H01R 13/6581 439/607.41 |
| 2015/0255928 | A1 | 9/2015 | Liptak et al. | |
| 2016/0036155 | A1 | 2/2016 | Kataoka et al. | |
| 2018/0102597 | A1 | 4/2018 | Hiroyoshi et al. | |
| 2018/0351305 | A1 | 12/2018 | Maesoba et al. | |
| 2022/0200211 | A1* | 6/2022 | Maesoba .......... | H01R 13/65912 |

FOREIGN PATENT DOCUMENTS

| | | | | |
|---|---|---|---|---|
| EP | 2178177 | A1 | 4/2010 | |
| EP | 3096331 | A1 | 11/2016 | |
| EP | 3273542 | A1 | 1/2018 | |
| EP | 3376598 | A1 | 9/2018 | |
| EP | 3518353 | A1 | 7/2019 | |
| FR | 3074614 | A1 | 6/2019 | |
| FR | 3074614 | B1 * | 11/2019 | ............. H01R 4/184 |
| JP | 2003297493 | A | 10/2003 | |

OTHER PUBLICATIONS

CN Office Action; Application No. 202010837071.2; mailed Nov. 12, 2021.
English Translation; CN Office action; Application No. 202010837071.2; mailed May 24, 2022.
English Translation; CN Office Action; Application No. 202010837071.2; mailed Nov. 12, 2021.
Extended European Search Report for EP Application No. 19192622.9.

* cited by examiner

SHIELDED ELECTRICAL CONNECTOR FOR AUTOMOTIVE APPLICATIONS AND METHOD OF ASSEMBLING THEREOF

CROSS-REFERENCE TO RELATED APPLICATION(S)

This application is a continuation of U.S. application Ser. No. 16/998,188 filed Aug. 20, 2022, which claims the benefit of priority to European Patent Application No. 19192622.9.8, filed Aug. 20, 2019, the entire disclosure of which is hereby incorporated herein by reference.

TECHNICAL FIELD

The present disclosure relates to a method of assembling a connector for automotive applications, preferably multi GHz applications. In particular, the disclosure relates to a method of assembling an H-MTD® (High Speed Modular Twisted-Pair-Data) connector.

The present disclosure also relates to a connector for automotive applications and an assembly comprising such a connector. The connector is preferably usable for multi GHz applications. In particular, the disclosure relates to an H-MTD® connector and an assembly comprising such an H-MTD® connector.

BACKGROUND

The so called H-MTD® system is produced by a company called “Rosenberger Hochfrequenztechnik GmbH & Co. KG”. Connectors of said system are meant to allow data transmission up to 15 GHz or 20 Gbps while having a small package size. Applications for the H-MTD® system are 4K camera systems, autonomous driving, radar, lidar, high-resolution displays and rear seat entertainment.

There is a need for a simpler method of assembling a connector for automotive multi GHz applications and for such a connector that can be assembled more easily. Furthermore, there is a need for a connector and a method of assembling such a connector which allow less complicated quality control.

SUMMARY

The present disclosure provides a method of assembling a connector for automotive applications, comprising the steps of: providing a cable having at least one inner conductor; connecting at least one elongated inner signal contact of the connector to a stripped end of the at least one inner conductor; surrounding the at least one elongated inner signal contact by an insulating element; placing a first shielding part of the connector around a first portion of the insulating element from a first radial direction; placing a second shielding part of the connector around a second portion of the insulating element from a second radial direction generally opposite to the first radial direction; and joining the first and second shielding parts to form a shielding contact of the connector surrounding the insulating element.

One basic idea is therefore to divide the outer shielding contact into at least two parts that can be easily joined together during assembly. This allows placing the at least two shielding contact parts around the at least one inner signal contact from a radial direction instead of having to plug the at least one inner signal contact into the outer shielding contact from an axial direction. It has been found that assembly and quality control are simplified by the above mentioned method.

The present disclosure further provides a connector for automotive applications, comprising at least one elongated inner signal contact, an insulating element surrounding the at least one elongated inner signal contact, a first shielding part and a second shielding part, wherein the first and second shielding parts together form a shielding contact surrounding the insulating element.

Such a connector is simpler to assemble while quality control during assembly is also simplified.

Embodiments are given in the subclaims, the description and the drawings.

According to an embodiment, the first and second shielding parts each form a half shell. Such a half shell can be easily manufactured by a stamped/bent part.

According to a further embodiment, the first shielding part and/or the second shielding part comprise(s) at least one contact spring. Preferably, the first shielding part and/or the second shielding part comprise(s) multiple contact springs, such as four or five contact springs. This improves the electrical and mechanical connection between the connector and a mating connector.

According to an embodiment, the at least one elongated inner signal contact is connected to the stripped end of the at least one inner conductor by crimping and/or welding, in particular laser welding. Laser welding has the advantage that the electrical connection is improved.

According to a further embodiment, the at least one inner conductor is connected to a second connection portion of the at least one inner signal contact forming a tube. In particular, the tube can define a cross-section that changes along the tubes axial direction, in particular regarding its size. Preferably, the tube can have cylindrical and/or conical shape.

According to an embodiment, an opening is formed in the tube. The opening 26 can be used to check whether a respective stripped end of the at least one inner conductor can be seen through the opening. Furthermore, the opening can be used for welding the stripped end of the at least one inner conductor to the at least one inner signal contact.

To improve data rate through the connector, the provided cable can have at least two inner conductors and the connector can have at least two elongated inner signal contacts which are connected to stripped ends of the at least two inner conductors.

In order to safe time during assembly, it is preferred that the elongated inner signal contacts are connected to the stripped ends of the inner conductors simultaneously. This can be done by building a special crimping tool or by welding the inner signal contacts to the stripped ends of the inner conductors simultaneously.

According to an embodiment, the first and second shielding parts are joined by crimping and/or welding, in particular crimping and laser welding. Using both crimping and welding has the advantage than crimping can be used for pre-assembling the two parts and welding can then be used to finalize the connection between the first and second shielding parts.

One option how to surround the at least one elongated inner signal contact by the insulating element is by snapping the insulating element onto the at least one elongated inner signal contact so that a form-fit connection is established between the insulating element and the at least one elongated inner signal contact. Preferably, the insulating element is connected to the at least one elongated inner signal contact by axially inserting the at least one inner signal contact into at least one channel or opening of the insulating element until an elastically deformable part of the insulating element engages behind a locking surface of the at least one inner signal contact.

A second option how to surround the at least one elongated inner signal contact by the insulating element is to form the insulating element out of a first and a second insulating part that are joined together during assembly. In this embodiment, the at least one elongated inner signal contact is surrounded by the insulating element by placing the first insulating part around a peripheral portion of the at least one elongated inner signal contact from a first, in particular axial, direction and by placing the second insulating part around a remaining peripheral portion of the at least one elongated inner signal contact from a second, in particular radial, direction different from the first direction. The second insulating part can comprise a locking surface which engages with a locking surface of the at least one inner signal contact to limit or prevent axial movement of the at least one inner signal contact relative to the insulating element.

A third option how to surround the at least one elongated inner signal contact by the insulating element is to overmold the at least one elongated inner signal contact with an insulating material to form the insulating element. If the at least one elongated inner signal contact is formed as a tube, it should be made sure that the inner space of the tubes is not filled up with mold.

Overmolding the at least one elongated inner signal contact with an insulating material to form the insulating element can be done before the at least one elongated inner signal contact is connected to respective conductors of a cable. In this case, the portions of the at least one elongated inner signal contact that are connected to the wires, e.g. the crimping or welding portions of the at least one elongated inner signal contact, should not be overmolded.

In order to better secure a mechanical and/or electrical connection between the first and second shielding parts, an outer cover can be positioned around the first and second shielding parts. The cover can form a closed circumference around the first and second shielding parts. The first and second shielding parts can have one or multiple connecting wings that are in contact with an inner peripheral surface of the cover to mechanically hold the connecting wings in place and/or electrically connect the first and second shielding parts with the cover. Preferably at least one of the connecting wings is biased against the cover to secure an electrical connection between the at least one of the first and second shielding parts and the cover.

According to an embodiment, the outer cover comprises a first and a second cover part. The first cover part is positioned around a portion of the first shielding part and around a portion of the second shielding part from a third radial direction different from the first and second radial directions. Similarly, the second cover part is positioned around a portion of the first shielding part and around a portion of the second shielding part from a fourth radial direction. The fourth radial direction can be located generally opposite to the third radial direction.

According to an embodiment, at least one of the first and second shielding part is molded over by an electrically insulating material. In particular, the first and the second shielding part can be partially overmolded by an electrically insulating material. An inner and/or outer surface of the first and/or second outer shielding part can be overmolded. In particular, an inner surface of the first and/or second outer shielding part can be partially overmolded such that a rib is formed on an inner side of the at least one of the first and second shielding parts for electrically insulating the two inner conductors from one another. Alternatively or additionally, edges of the insulating material can be formed on an outer side of the at least one of the first and second shielding parts for locking the connector in a connector housing and/or by a TPA (terminal position assurance). In other words, the insulating material can form first and second locking means that correspond to first and second locking means of a connector housing.

According to an embodiment, the step of surrounding the at least one elongated inner signal contact by the insulating element is performed before the step of connecting the at least one elongated inner signal contact to the stripped end of the at least one inner conductor. In other words, the at least one elongated inner signal contact and the insulating element are pre-assembled before connecting them to the at least one stripped end of the at least one inner conductor. Alternatively, the step of surrounding the at least one elongated inner signal contact by the insulating element can be performed after the step of connecting the at least one elongated inner signal contact to the at least one stripped end of the at least one inner conductor.

According to an embodiment, the connector is a female connector. Alternatively, the connector can be a male connector. The at least one elongated inner signal contact can comprise a first connection portion and/or a second connection portion generally formed as a tube.

According to a further aspect, an assembly comprising a connector with one or more of the aforementioned or afterwards mentioned features connected to a shielded cable, e.g. a shielded-twisted-pair cable or a shielded-parallel-pair cable is provided. Using the connector with a shielded-twisted-pair cable or a shielded-parallel-pair cable allows transferring data in a vehicle with a high data rate.

According to an embodiment, multiple elongated inner signal contacts are each crimped and/or welded to wires of the shielded-twisted-pair cable or the shielded-parallel-pair cable.

BRIEF DESCRIPTION OF THE DRAWINGS

Exemplary embodiments and functions of the present disclosure are described herein in conjunction with the following drawings, showing.

DETAILED DESCRIPTION

Figure 1:
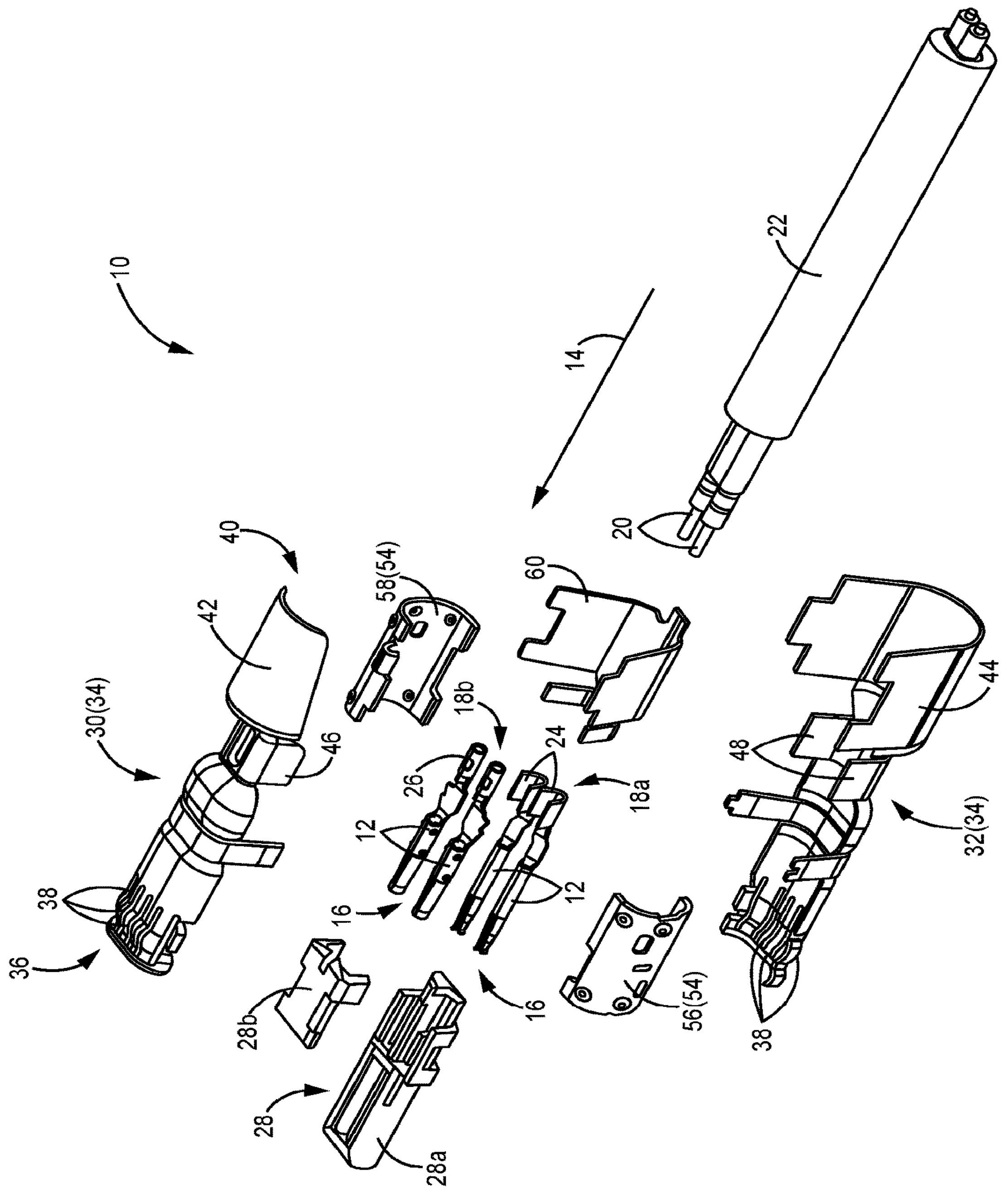
FIG. 1 is an exploded view of a connector according to the claimed subject matter.

FIG. 1 depicts an exploded view of a connector 10, in particular a female connector, comprising two elongated inner signal contacts 12 arranged generally parallel to each other along a plug or axial direction 14 of the connector 10. The signal contacts 12 have a first connection portion 16 for connecting the connector 10 to a mating connector, in particular a mating male connector, and a second connection portion 18 for connecting the signal contacts 12 to respective conductors or wires 20 of a cable 22. The second connection portion 18, as depicted by the two alternatives shown in FIG. 1, can be formed as a crimping portion 18*a* having two crimping wings 24 or can be formed as a welding portion 18*b* having a welding opening 26. The welding opening 26 can be used to connect the signal contacts 12 to respective conductors or wires 20 of the cable 22 via laser welding. Alternatively, resistance welding can be used to connect the signal contacts 12 to respective conductors or wires 20 of the cable 22.

Around the inner signal contacts 12 an insulating element 28 which can be called di-electric housing is arranged. In the embodiment shown in FIG. 1, the insulating element 28 is made out of two separate parts 28*a* and 28*b*. The first and second parts 28*a* and 28*b* of the insulating element 28 are attachable to each other by a click-on connection, i.e. a snap fit engagement. The second part 28*b* fulfills the task of locking the signal contacts 12 in an axial direction so that the inner signal contacts 12 remain in their axial position when the connector 10 is connected to a mating connector. A more detailed explanation of this feature will be given in regard to FIGS. 14 and 15.

The connector 10 further comprises a first shielding part 30 and a second shielding part 32 both formed as half shells which together form an outer shielding contact 34. The outer shielding contact 34 surrounds the inner signal contacts 12 and the insulating element 28 to provide a shield against interfering signals. However, the outer shielding contact 34 can also be used as an electrical conductor to transport electric power. At a distal end 36 of the connector 10, the outer shielding contact 34 comprises multiple shielding contacts 38 which are discussed in more detail regarding FIGS. 8 and 9. At a proximal end 40 of the connector 10, the first shielding part 30 forms a cover 42 which is discussed in more detail in regard to FIG. 7B. The second shielding part 32 forms a crimping portion 44 at the proximal end 40 of the connector 10 to mechanically and electrically connect the outer shielding contact 34 to the cable 22. Furthermore, the first and second shielding parts 30, 32 each disclose wings 46, 48 to create an inner shield 50 and an outer shield 52 overlapping the inner shield 50. A more detailed description of the inner and outer shield 50, 52 is given in regard to FIGS. 6A and 6B.

In order to better secure the connection between the first shielding part 30 and the second shielding part 32, a cover 54 comprising a first cover part 56 and a second cover part 58 are placed around the first and second shielding parts 30, 32 and are connected to each other, in particular via a click-on connection. The first and second cover parts 56, 58 have a C-shaped cross section so that they can each be placed around a half of the first shielding part 30 and the second shielding part 32. Furthermore, the connector 10 comprises an inner crimp ferrule 60 which is placed around the cable 22.

Figure 2A:
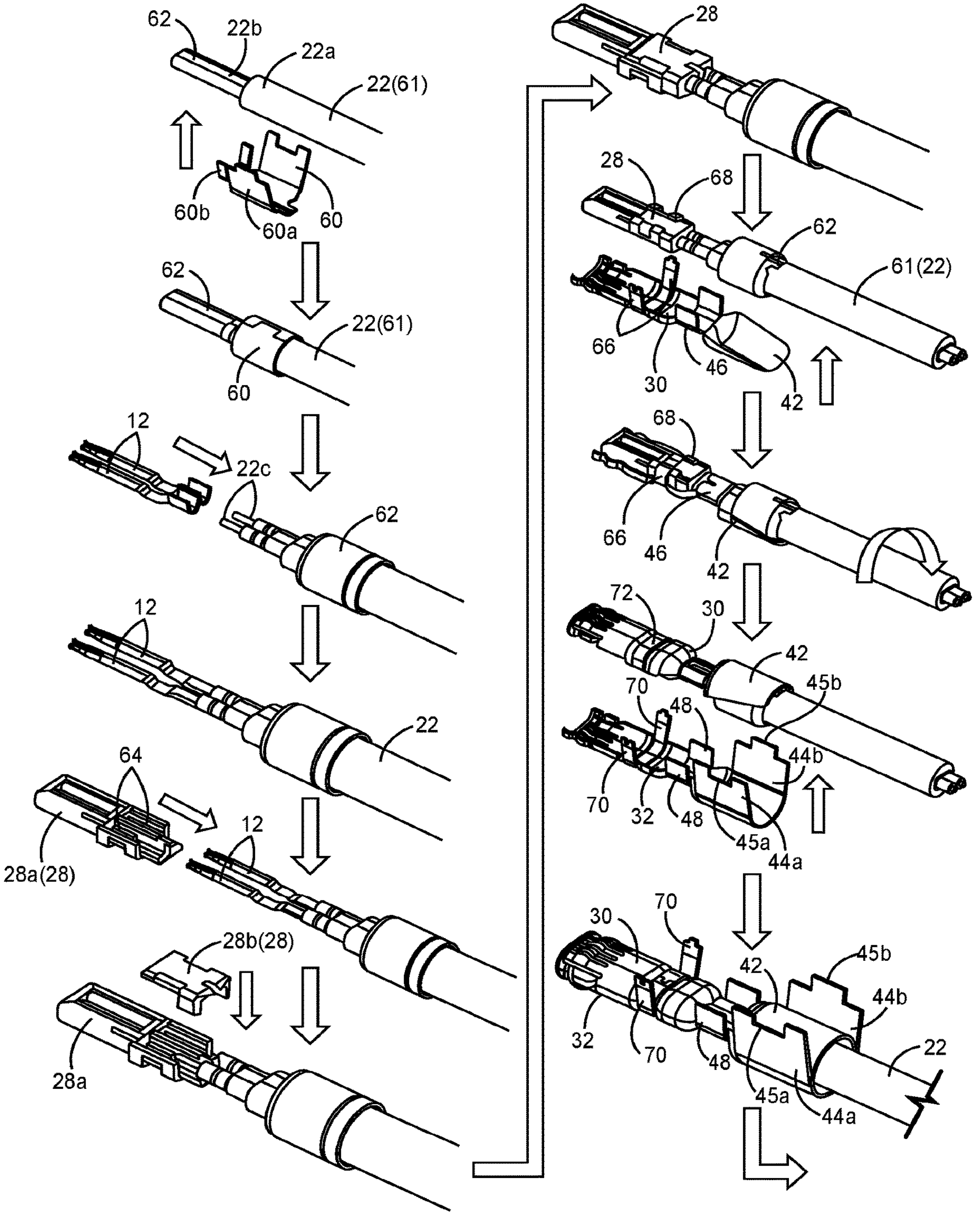
FIG. 2A to 2C is an assembly instruction for the connector of FIG. 1.
Figure 2B:
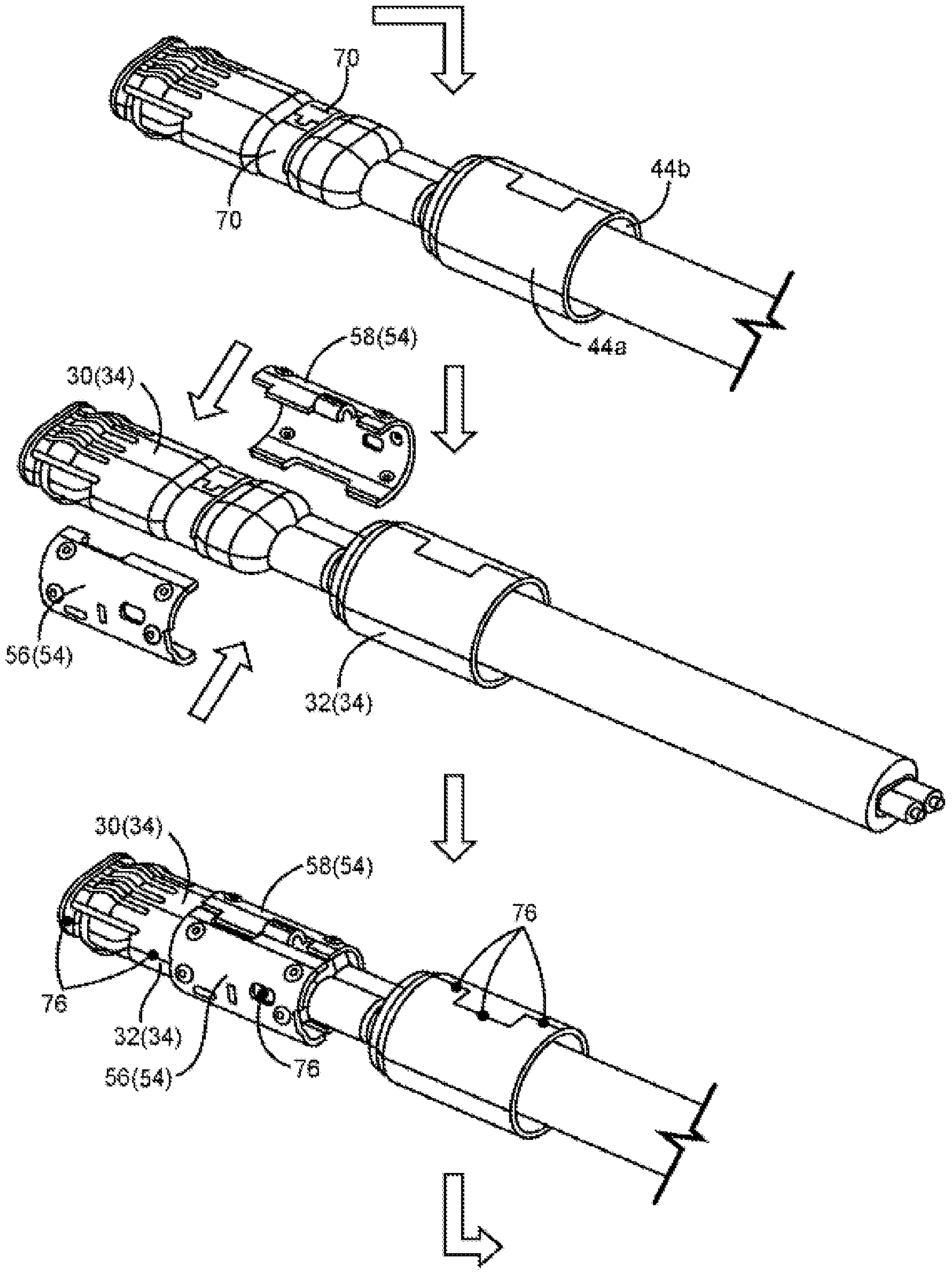
Figure 2C:
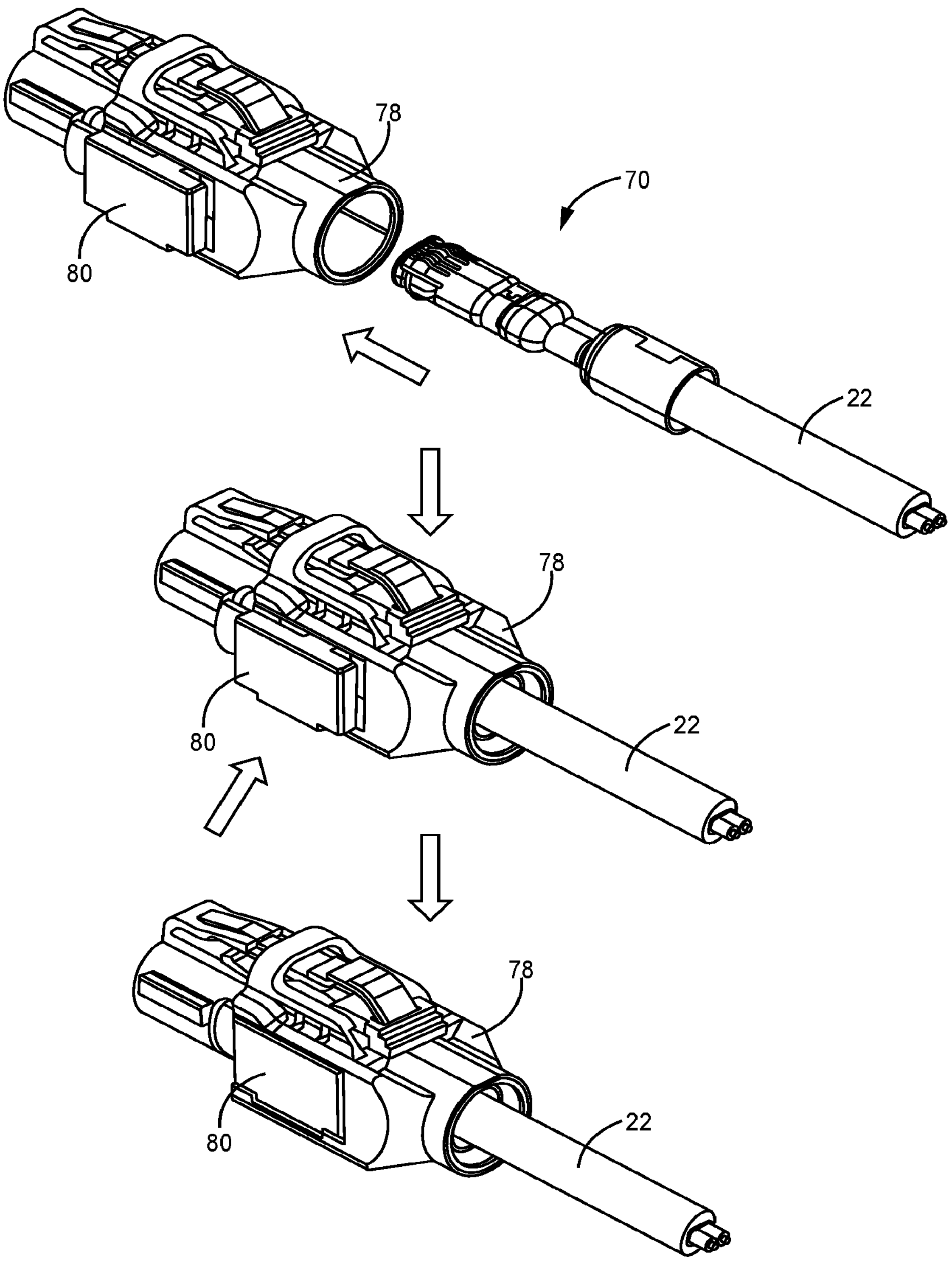

FIGS. 2A to 2C depict an assembly instruction for the connector 10 of FIG. 1. In a first step, the inner crimp ferrule 60 is crimped onto the cable 22. The inner crimp ferrule 60 has a first portion 60*a* that is crimped around portion 22*a* of the cable 22 where a protection layer 61 is the outermost layer of the cable 22. The inner crimp ferrule 60 further has a second part 60*b* which is formed around a portion 22*b* of the cable 22 where a shield layer 62 of the cable 22 is the outermost layer of the cable 22, i.e. where the protection layer 61 has been removed. After the inner crimp ferrule 60 is connected to the cable 22, the shield layer 62 is folded backwards over the inner crimp ferrule 60. Additionally, end sections 22*c* of the cable 22 are stripped so that the conductors or wires 20 of the cable 22 are not surrounded by insulation material anymore. In the next step, the inner signal contacts 12 are connected to the stripped sections 22*c* of the wires 20. While the inner signal contacts 12 are connected via crimping in the shown embodiment, the electrical connection between the inner signal contacts 12 and the wires 20 can be improved if the connection is established by welding, in particular laser welding. To improve cycle time of this connecting step, the two inner signal contacts 12 can be connected to the stripped sections of the wires 20 simultaneously.

After the inner signal contacts 12 are attached to the wires 20, the first part 28*a* of the insulating element 28 is put on the inner signal contacts 12 from the axial direction 14 so that the inner signal contacts 12 are assimilated in axial channels 64 of the first part 28*a* of the insulating element 28. Then, the second part 28*b* of the insulating element 28 is clicked on the first part 28*a* of the insulating element 28 from a radial direction. Thereby, the inner signal contacts 12 are axially fixed to the insulating element 28.

After the insulating element 28 is connected to the inner signal contacts 12, the first shielding part 30 is placed onto a section extending from a distal end of the insulating element 28 to a section of the cable 22 where the shield layer 62 is folded backwards onto the protection layer 61 of the cable 22. In order to connect the first shielding part 30 to the insulating element 28, the first shielding part 30 comprises two connecting wings 66 which are bent around the insulating element 28 in order to radially fixate the first shielding part 30 onto the insulating element 28. For axial fixation of the first shielding part 30, blocking elements 68 are formed on an outer surface of the insulating element 28. The blocking elements 68 engage with the connecting wings 66 in order to limit or prevent axial movement of the first shielding part 30. Furthermore, in a section of the cable 22 right before the distance between the wires 20 is increased, the shielding wings 46 are placed onto the cable 22 and bent almost all the way around the wires 20 and their respective insulation (cf. FIG. 6B). By placing the first shielding part 30 onto the insulating element 28 and the cable 22, the cover 42 comes into contact with the back-folded portion of the shield layer 62.

For simplifying explanation of the method of assembling, the assembly is turned in the figures. However, this is not a necessary step in production.

After the first shielding part 30 is securely fixed to the insulating element 28 and the cable 22, the second shielding part 32 is attached to the assembly from an opposite radial side. The second shielding part 32 comprises connecting wings 70 which are bent around the first shielding part 30 to radially fixate the second shielding part 32 onto the first shielding part 30. A groove 72 extending perpendicular to the axial direction 14 is formed on the outer surface of the first shielding part 30 into which the connecting wings 70 of the second shielding part 32 are placed. Thereby, the second shielding part 32 is axially fixated onto the first shielding part 30. Additionally, a rather smooth outer surface of the shielding contact 34 is generated.

The second shielding part 32 further comprises the wings 48 which are positioned in a corresponding axial section to the section of the wings 46. In order to establish a so called "EMC-labyrinth", i.e. a shield where interference signals run dead, the second wings 48, same as the wings 46, are bent so that they surround the respective section of the cable 22 almost completely. Since the first and second shielding parts 30, 32 are placed around the cable from opposite sides, gaps 74, 75 (cf. FIG. 6B) which are present at least in an axial section between peripheral end sections 46*a*, 46*b*, 48*a*, 48*b* of the wings 46, 48 are positioned on opposite sides of the cable 22.

The second shielding part 32 also comprises the crimping portion 44 which is arranged in a corresponding axial section to the section of the cover 42 of the first shielding part 30. The crimping portion 44 comprises two crimp wings 44*a*, 44*b* which are bent around the cable 22 and the cover 42 of the first shielding part 30. The crimp wings 44*a*, 44*b* define corresponding peripheral ends 45*a*, 45*b*. The cover 42 is helpful to hold the shield layer 62, usually a braid, down while the crimp wings 44*a*, 44*b* are bent around the cable 22. It has been found that providing such a cover 42 improves production quality and robustness against cable abuse.

After the second shielding part 32 is fixated on the first shielding part 30, the cover 54 is placed around the first and second shielding parts 30, 32 to secure the connection between the first and second shielding parts 30, 32. The cover 54, as mentioned before, comprises two parts: the first cover part 56 and the second cover part 58. The first cover part 56 is positioned around portions of the first and second shielding parts 30, 32 from a radial direction different from the directions from which the first and second shielding parts 30, 32 are placed onto the assembly. The second cover part 58 is also positioned around portions of the first and second shielding parts 30, 32 from a radial direction different from the directions from which the first and second shielding parts 30, 32 and the first cover part 56 are placed onto the assembly. In particular, the first and second cover parts 56, 58 are placed onto the first and second shielding parts 30, 32 from opposite radial directions. In order to connect the first and second cover parts 56, 58 together, connecting means are provided at the first and second cover parts 56, 58, in particular snap fit engagement means.

After the first and second cover parts 56, 58 are connected to each other, the first and second shielding parts 30, 32 are welded together at welding positions 76. Then, the connector 10 is inserted into a connector housing 78, in particular a female connector housing. The shown connector housing 78 is compliant to the standards set for the above mentioned H-MTD® system. In order to attach the connector housing 78 to the connector 10, the connector housing 78 comprises terminal position assurance (TPA) 80 in form of a pusher. The pusher 80 is pushed radially into the connector housing 78 to axially connect the connector housing 78 to the connector 10.

Figure 3:
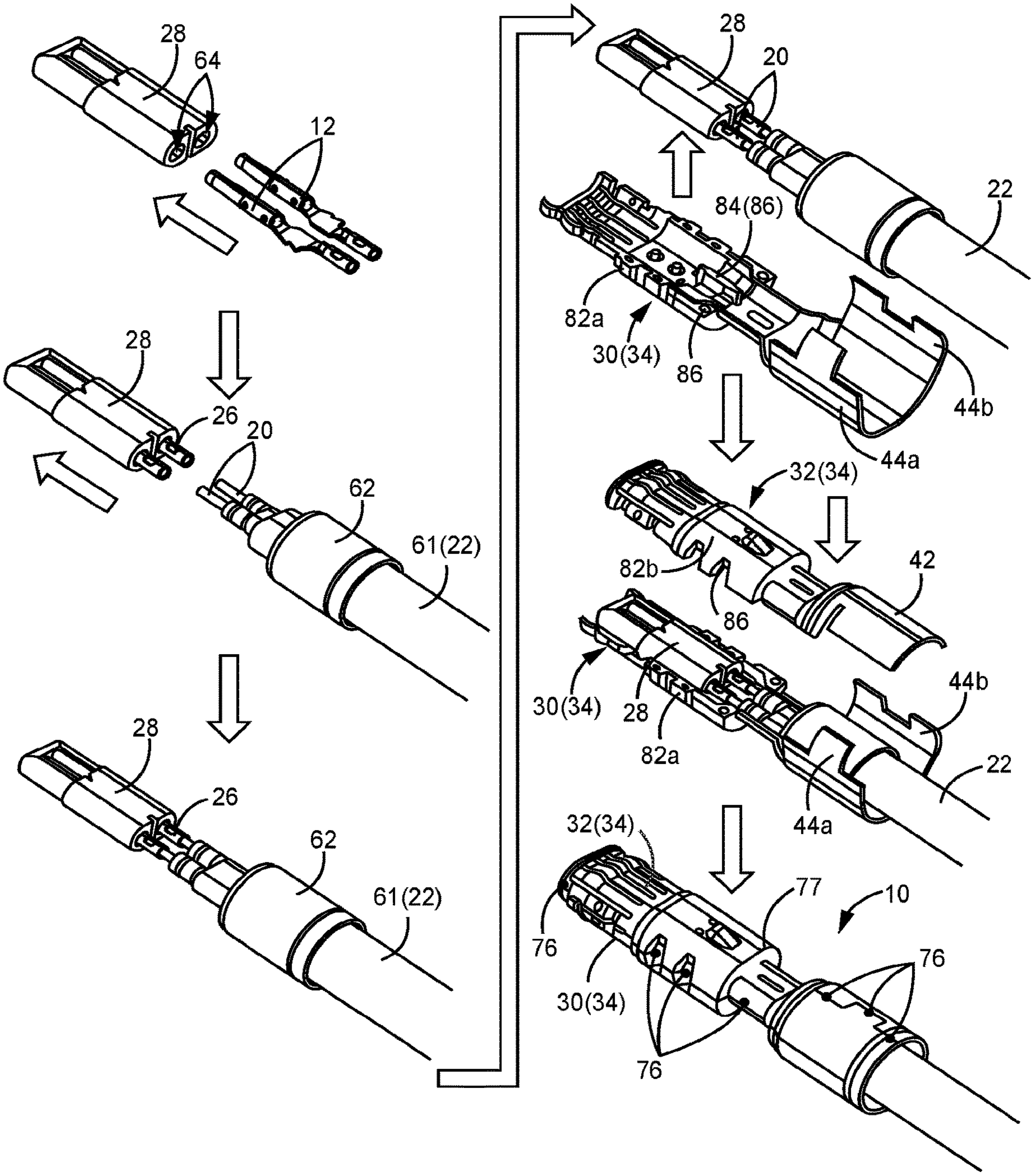
FIG. 3 is an assembly instruction for a second connector according to the claimed subject matter.
Figure 14:
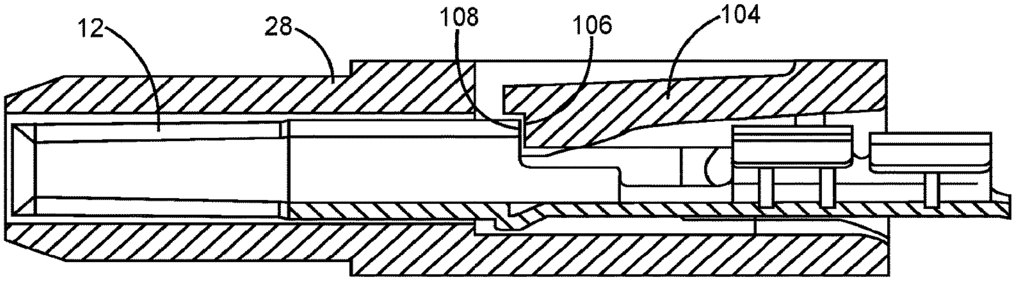
FIG. 14 is a sectional side view of a signal contact embedded in an insulating element according to a first embodiment.

FIG. 3 depicts an assembly instruction for a connector 10 according to a second embodiment. According to the assembly method, the inner signal contacts 12 are axially inserted into the insulating element 28. In this example, the insulating element 28 is formed as a single integral part. In the insulating element 28, two axially extending passage openings 64 are formed which receive the inner signal contacts 12. The inner signal contacts 12 can be axially fixated on the insulating element 28 by a snap-lock connection as shown in FIG. 14. The inner signal contacts 12 can alternatively or additionally be axially fixated on the insulating element 28 by hooks 103 (FIG. 12A) or dimples formed on the inner signal contacts 12 and interfering with the insulating element 28. An insertion depth controlled by an assembly machine can be used to make sure that both inner signal contacts 12 are inserted the same distance into the insulating element 28. After the inner signal contacts 12 are pre-assembled with the insulating element 28, the inner signal contacts 12 are connected to the wires 20 by laser or resistance welding.

After the inner signal contacts 12 are connected to the wires 20, a first shielding part 30 is placed around the insulating element 28 and the cable 22. However, compared to the assembly process described regarding FIGS. 2A to 2C, the shielding part 30 placed first around the insulating element 28 has the crimp wings 44*a*, 44*b*. A second difference between the assembly processes is that the first shielding part 30 in FIG. 3 has an insulating layer 82*a* which was molded over a section of the first shielding part 30. The insulating layer 82*a* comprises a rib 84 which is placed between the two wires 20 of the cable 22 to establish a further insulation between the wires 20. After the first shielding part 30 is placed around the insulating element 28 and the cable 22, a second shielding part 32 is also placed around the insulating element 28 and the cable 22. The second shielding part 32 also has as an insulating layer 82*b* which was molded over a section of the second shielding part 32. As can be seen in FIG. 3, the insulating layers 82*a* and 82*b* together form an insulating layer 82 formed on the inside an the outside of the first and second shielding parts 30, 32. This insulating layer 82 allows forming multiple quality control elements 86 which can be used to evaluate whether the first and second shielding parts 30, 32 are joined together correctly and whether the wires 20 and/or the insulating element 28 are located in the right place.

After placing the second shielding part 32 onto the first shielding part 30, the crimp wings 44*a*, 44*b* of the first shielding part 30 are crimped around the cover 42 of the second shielding part 32 and the first and second shielding parts 30, 32 are connected to each other via laser welding.

Figure 4:
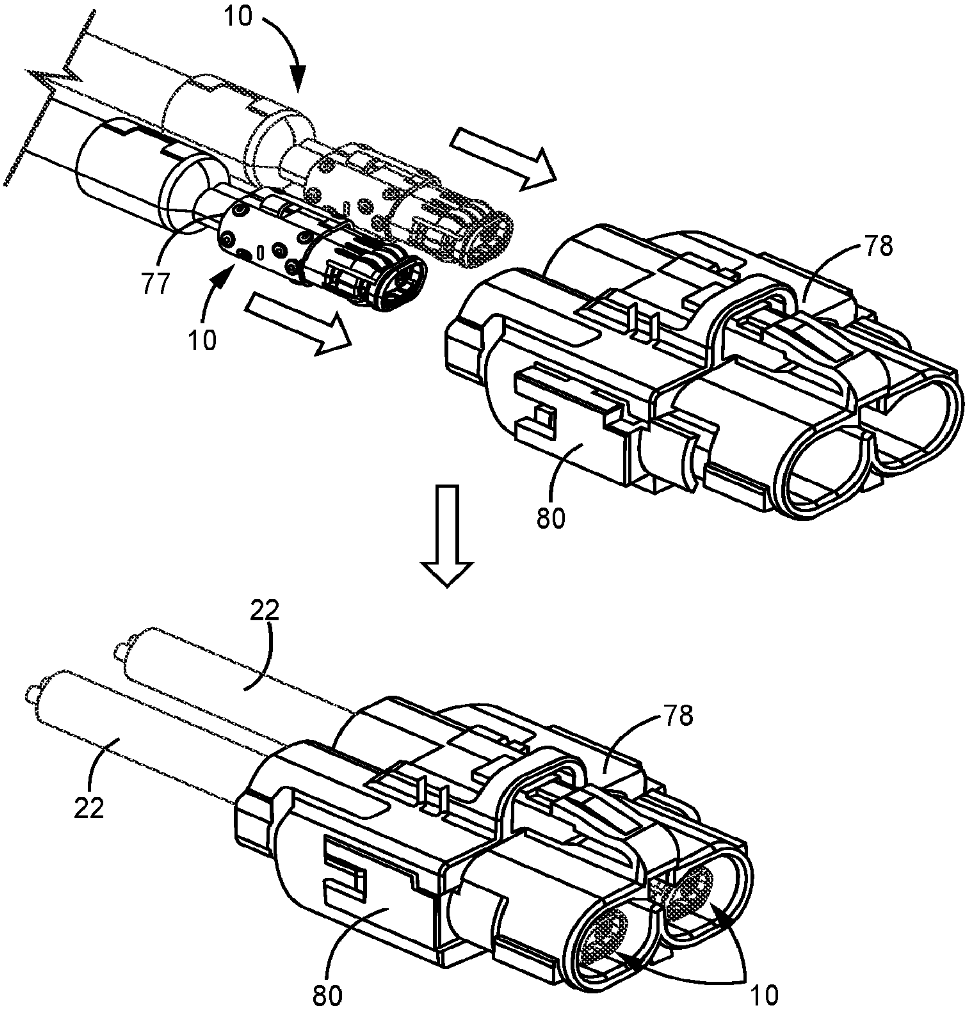
FIG. 4 is a 2-Port connector with two of the connectors of FIG. 1.
Figure 5:
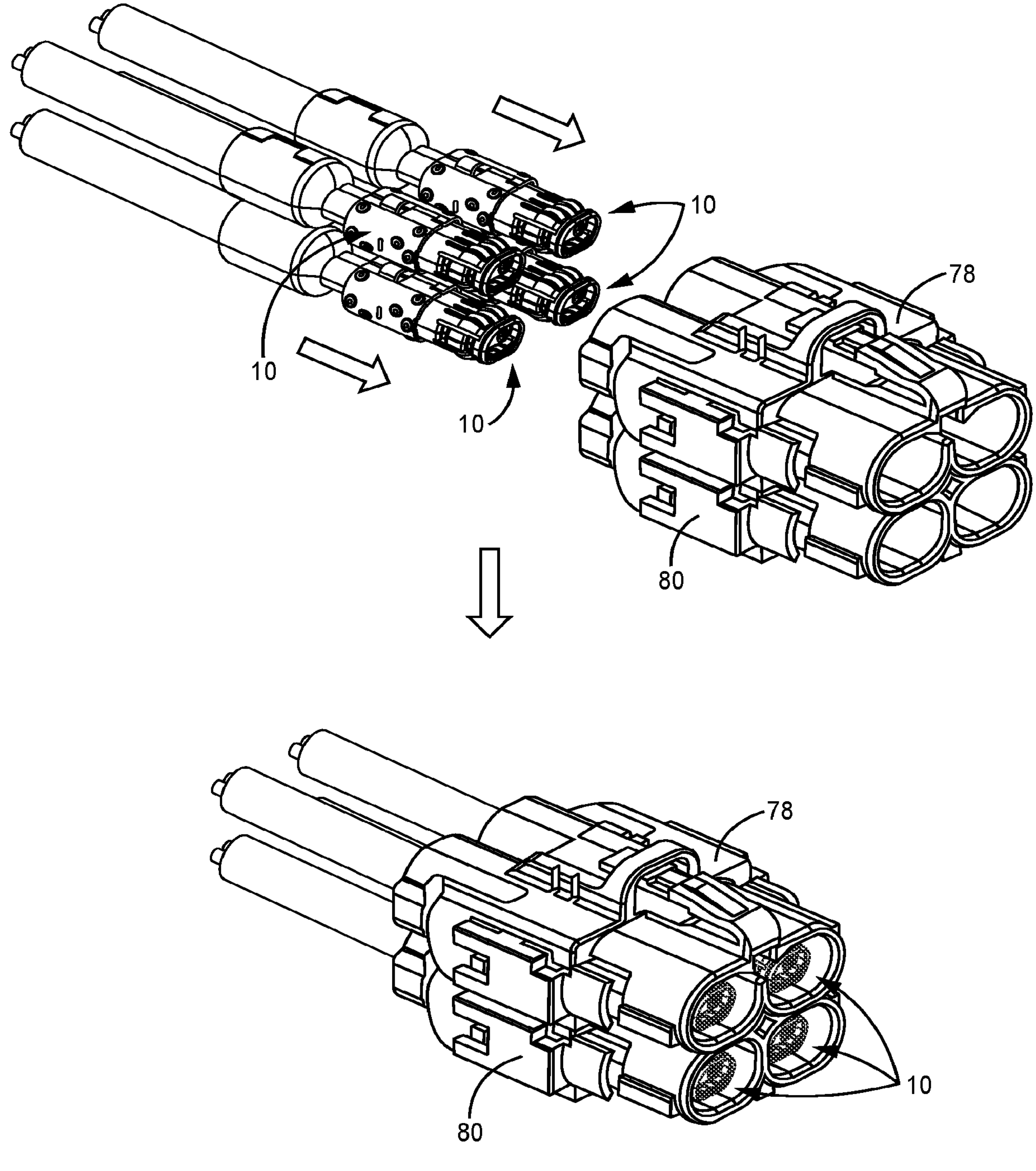
FIG. 5 a 4-Port 2-Row connector with four of the connectors of FIG. 1.

FIGS. 4 and 5 depict options how to group multiple connectors 10 together. In FIG. 4 a connector collector housing 78 is shown that is connected to two female connectors 10. The cover parts 56, 58 or the insulating layers 82*a* and 82*b* (FIG. 3), in particular their rear edges 77, can be used to securely lock the connectors 10 within the collector housing 78. In particular, they can be used to enably a primary and secondary lock of the connector 10 in the housing 78. Using such a connector collector housing 78 allows faster assembly of an electrical wiring harness of a car. In FIG. 5, a connector collector housing 78 capable of taking up four connectors 10 arranged in two lines and 2 rows is shown. This connector housing 78 allows connecting four cables 22 to mating cables at once.

Figure 6A:
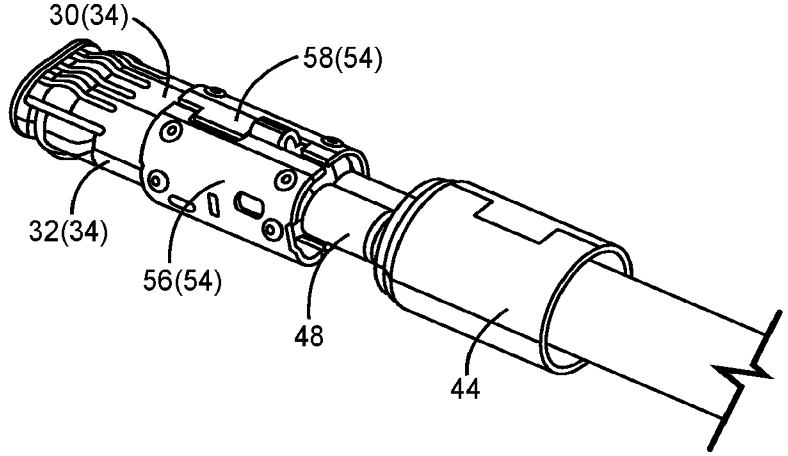
FIG. 6A is a perspective view of the connector of FIG. 1 from a proximal side.
Figure 6B:
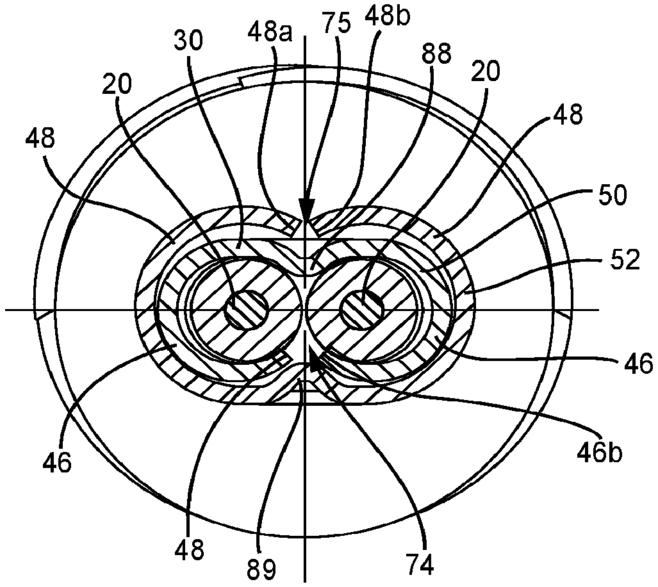
FIG. 6B is a cross-sectional view of the connector of FIG. 1 along the dashed line of FIG. 6A.

FIGS. 6A and 6B depict a section of the connector 10 where wings 46, 48 of the first and second shielding parts 30, 32 are located. FIG. 6B shows a cross sectional view of the above mentioned section along the dashed line shown in FIG. 6A. In an inner region of the connector 10, two insulated conductors or wires 20 extend generally parallel to each other. Around the wires 20, the inner shield 50 is formed by the wings 46 of the first shielding part 30. The inner shield 50 almost completely surrounds the wires 20. Only a small gap 74 is left between the peripheral ends 46*a*, 46*b*. As can be seen from FIG. 6B, the gap 74 is smaller than a distance between outer surfaces of the conductors 20. At an opposite side of the gap 74, an embossment 88 is formed so that the inner shield 50 extends into a free space between insulations of the two wires 20. One could say that the inner shield 50 therefore has a cross sectional shape similar to two scuba tanks or scuba glasses. Around the inner shield 50, the outer shield 52 is formed. The outer shield 52 has a similar general shape as the inner shield 50 but it has a larger diameter. Therefore, a second gap 75 is present between the peripheral ends 48*a*, 48*b* of the wings 48. The gap 75 between the peripheral ends 48*a*, 48*b* of the wings 48 is located at the angular position of the embossment 88 formed in the wing 46. On the other hand, the outer shield 52 also forms an embossment 89 which is located at the angular position of the gap 74 of the inner shield 50. The two shields 50, 52 create an "EMC-labyrinth" which provides improved shielding to the wires 20 against interfering signals.

At an axial beginning and an axial end of the section where wings 46, 48 of the first and second shielding parts 30, 32 are located, namely the tunnel in tunnel section, the gaps 74 and 75 are closed by the embossment 89 being in contact with the wings 46*a* and 46*b*. The wings 46*a* and 46*b* can be pushed against the embossment 89 by mounting the cover part 54 onto the first and second outer shielding contacts 30, 32. In order to make sure that the embossment 89 is in contact with the wings 46*a* and 46*b* only at the axial beginning and the axial end of the tunnel in tunnel section, the embossment can be larger and/or higher at the axial beginning and the axial end in comparison to a middle section of the embossment. As such, a return current which flows on the outer shielding contact 34 does not need to make any detours and can remain running in parallel and close by the signal currents.

Figure 7A:
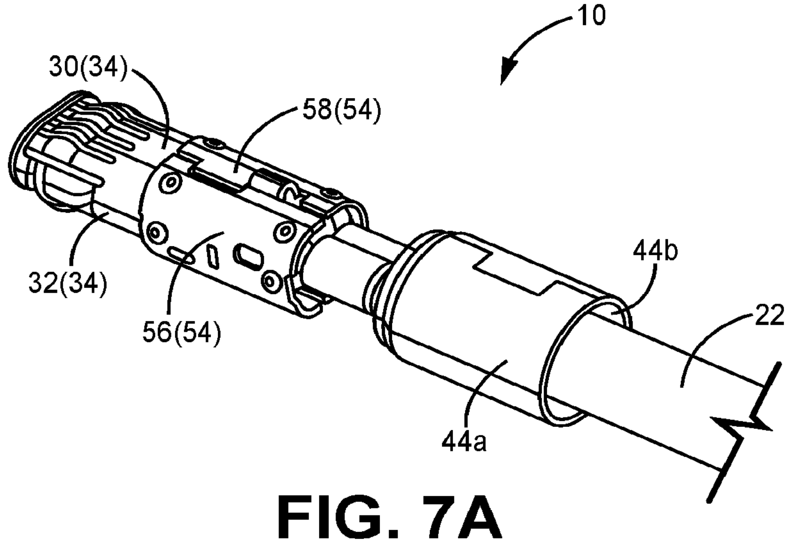
FIG. 7A is a perspective view of the connector of FIG. 1 from a proximal side.
Figure 7B:
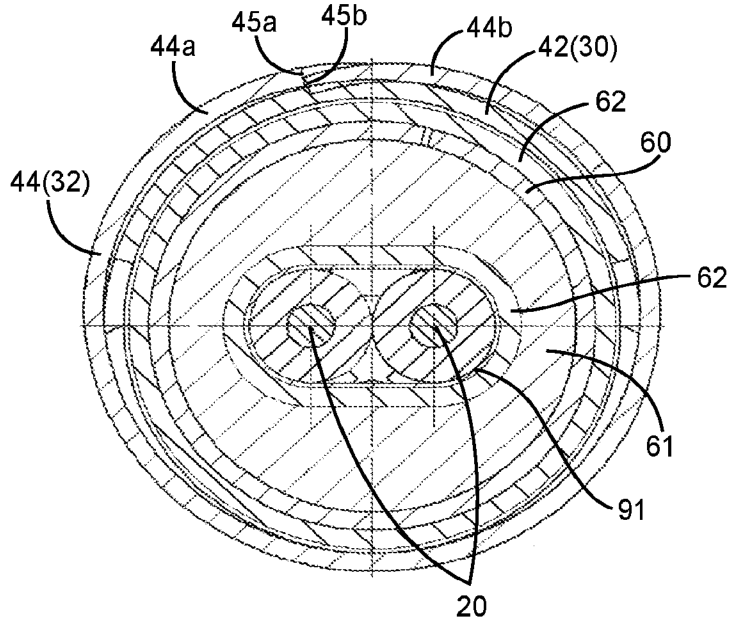
FIG. 7B is a cross-sectional view of the connector of FIG. 1 along the dashed line of FIG. 7A.

FIGS. 7A and 7B depict a section of the connector 10 where the first and second shielding parts 30, 32 are connected to the cable 22. In a center of the cross-section depicted in FIG. 7B, two insulated wires 20 are shown. Around the wires 20, a foil 91 is arranged. Then, the shield layer 62 of the cable 22 is arranged around the foil 91. The shield layer 62 of the cable 22 is formed as a braid. Around the shield layer 62, the protection layer 61 of the cable 22 usually forming the outmost layer of the cable 22 is arranged. In the section shown in FIG. 7B, the inner crimp ferrule 60 is attached to the outer surface of the protection layer 61. The shield layer 62 is folded backwards onto the inner crimp ferrule 60. On top of the back-folded shield layer 62, in a top section of the cable, the cover 42 of the first shielding part 30 is placed. On top of the cover 42 and the back-folded shield layer 62, the crimping portion 44 of the second shielding part 32 is placed. As can be seen from FIG. 7B, the peripheral ends 45*a*, 45*b* of the crimp wings 44*a*, 44*b* of the second shielding part 30 are placed in an angular section where the cover 42 covers the shield layer 62. Hence, the shield layer 62 is protected from the peripheral ends 45*a*, 45*b* of the crimp wings 44*a*, 44*b*.

Figure 8:
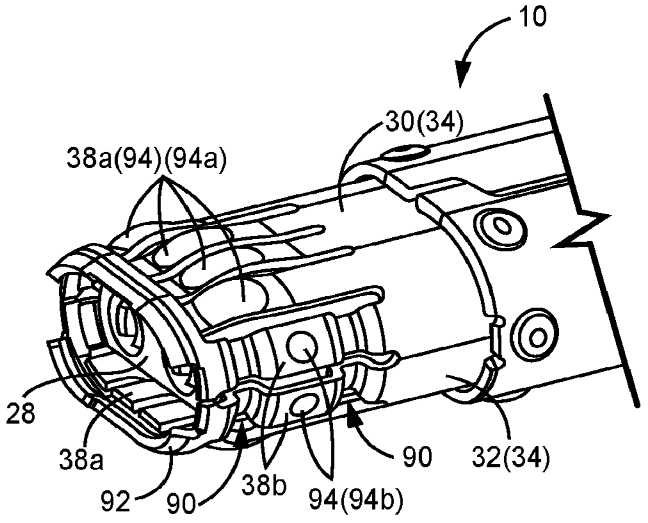
FIG. 8 is a perspective view of a distal end of a connector according to a first embodiment.

FIG. 8 depicts a distal end of the connector 10 according to a first embodiment. The shielding contact 34 is formed from the first and second shielding parts 30, 32. A distal end portion of the first and second shielding parts 30, 32 is mirror symmetrical so that the opposite side not shown in FIG. 8 of said distal end portion looks the same. The shielding contact is oval and thus has two longer sides and two shorter sides. At the longer sides, a first group 38*a* of shielding contacts 38 are positioned which generally extend in the axial direction 14 and are elastically deformable in a radial direction. At the shorter side of the connector 10, a second group 38*b* of shielding contacts 38 is formed on the shielding contact 34. The second group 38*b* of shielding contacts 38 consists of four shielding contacts 38*b* which each comprise two U-shaped portions 90. The U-shaped portions 90 are design so that the bottom part of each U-shaped portion 90 is closest to the insulating element 28 arranged at an inside of the shielding contact 34. The second group 38*b* of shielding contacts 38 is connected via a distal ring element 92. The distal ring element 92 is formed of two ring segments, each connecting two second group shielding contacts 38*b* of the respective first and second shielding part 30, 32. The distal ring element 92 holds the first group 38*a* of shielding contacts 38 in a pre-loaded position, i.e. the first group 38*a* of shielding contacts 38 push against an inner side of the distal ring element 92. This allows plugging the connecter 10 into a mating connector needing less force. The distal ring element 92 also prevents that ends of the shield contacts 38*a* can get caught by another element and be pulled outwards and thus be damaged. Furthermore, each of the shielding contacts 38 has a defined contact point 94 which is defined by an elevation at the outer surface of the respective contact 38. In order to lower the needed force to plug in the connector 10 in a mating connector, some of the contact points 94 are axially spaced apart from other contact points 94. In particular, contact points 94*a* of the first group 38*a* of shielding contacts 38 are axially distanced from contact points 94*b* of the second group 38*b* of shielding contacts 38. In the embodiment shown in FIG. 8, the first group 38*a* of shielding contacts 38 has two separate types of shielding contacts 38*a*, wherein the first type of shielding contacts 38*a*, the two inner shielding contacts, has contact points 94*a* which are axially distanced from contact points of the second type of shielding contacts 38*a*, the two outer shielding contacts.

Figure 9:
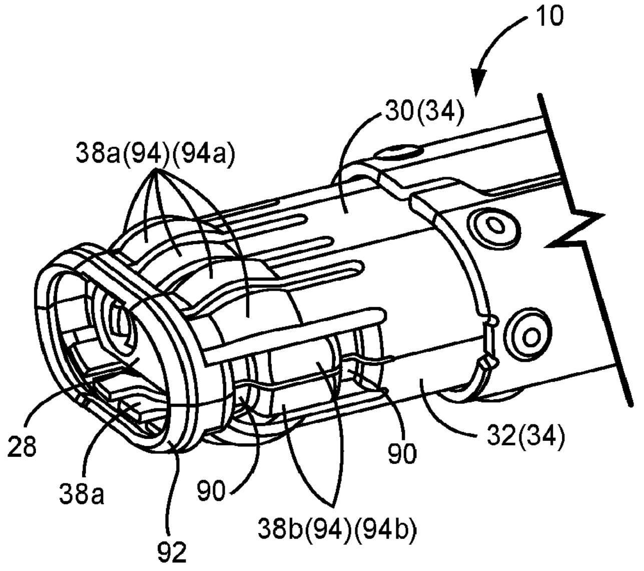
FIG. 9 is a perspective view of a distal end of a connector according to a second embodiment.

FIG. 9 depicts a distal end of the connector 10 according to a second embodiment. Instead of having a first group 38*a* of shielding contacts 38 having four upper contacts and four lower contacts 38*a*, the connector 10 has a first group 38*a* of shielding contacts 38 which consists of five upper contacts 38*a* and five lower contacts 38*a*. One of the first group 38*a* of shielding contacts 38 on each of the sides, the shielding contact 38*a* in the middle of the five shielding contacts 38, is designed as a sacrificial contact. Compared to the embodiment of FIG. 8, the distal ring element 92 of FIG. 9 is a closed ring element, i.e. the ring segments are connected to each other, e.g. by laser welding.

In both embodiments shown in FIGS. 8 and 9, the plurality of shielding contacts 38*a*, 38*b* are arranged symmetrically and generally equally distanced from each other. The plurality of shielding contacts 38*a*, 38*b* is integrally formed with their respective first or second shielding part 30, 32. The segments of the distal ring element 92 are also integrally formed with their respective first or second shielding part 30, 32. The first and second shielding parts 30, 32 can be made from sheet-metal and can be designed as a stamped/bent part.

Figure 10A:
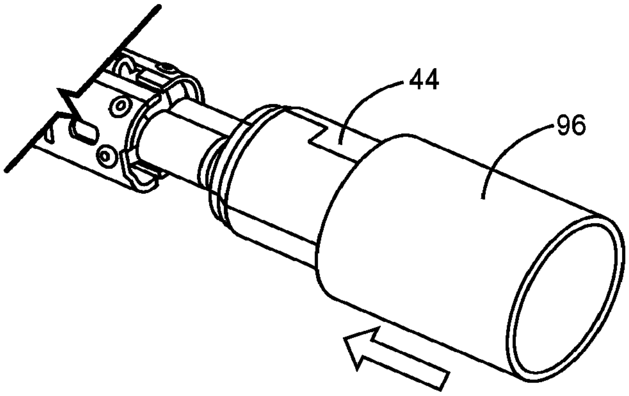
FIG. 10A is a perspective view of a proximal end of a connector wherein a crimp section of the connector is covered by an outer crimping tube.
Figure 10B:
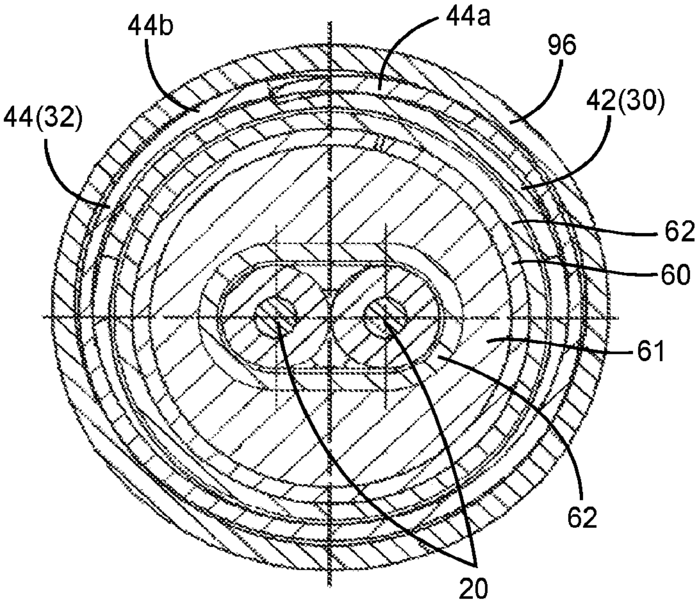
FIG. 10B is a cross-sectional view of the assembly of FIG. 10A along the dashed line of FIG. 10A.

FIGS. 10A and 10B depict an embodiment, wherein an outer crimping tube 96 is put on the crimping portion 44. In comparison to the cross-sectional view shown in FIG. 7B, in the cross-sectional view of FIG. 10B, there is additionally shown the outer crimping tube 96. The outer crimping tube 96, as is shown in FIG. 10A, can be put on the crimping portion 44 from a cable-side instead of a connector-side. Alternatively, a shrink tube (not shown), i.e. an elastic tube which shrinks when heat is being applied to it, can be used to cover the crimping portion 44.

Figure 11A:
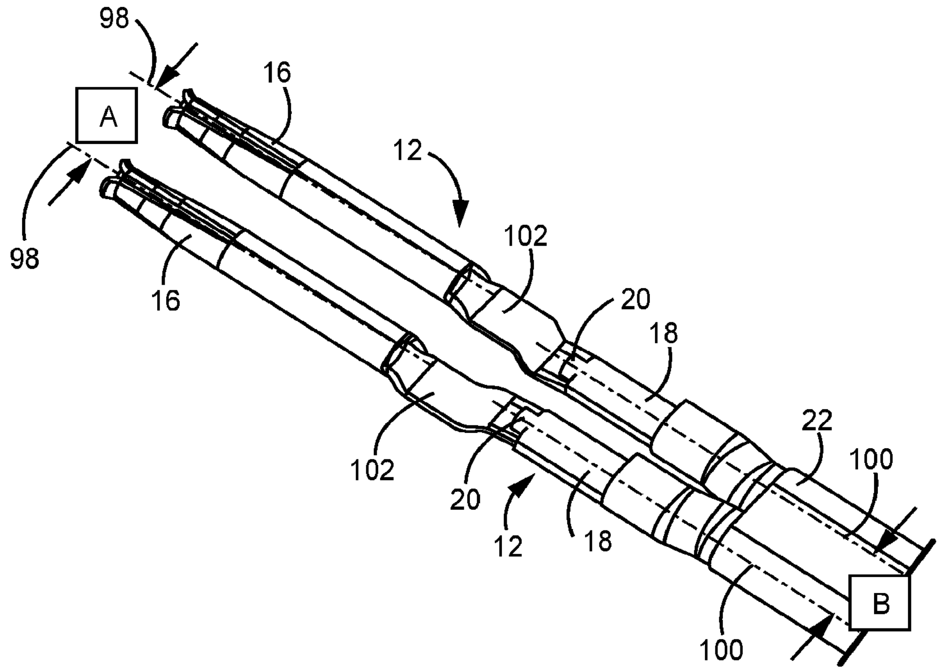
FIG. 11A is a perspective view of inner signal contacts according to a first embodiment.
Figure 11B:
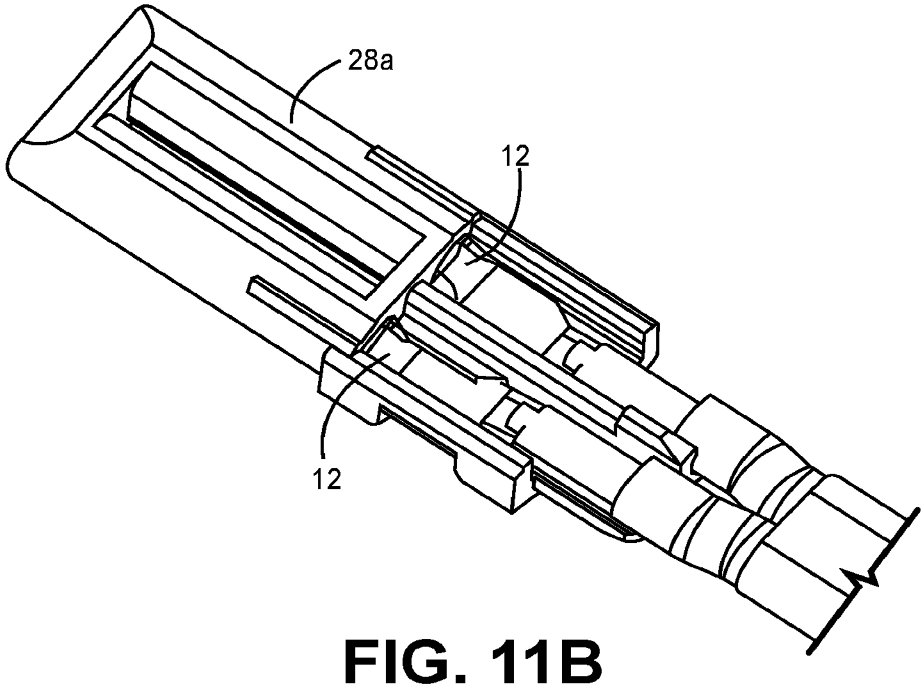
FIG. 11B is a perspective view of the inner signal contacts of FIG. 11A embedded in an insulating element.

FIGS. 11A and 11B depict the inner signal contacts 12 according to a first embodiment. The two elongated inner signal contacts 12 generally extend parallel to one another. Each inner signal contact 12 has a first connection portion 16 for connecting the signal contact 12 to a mating signal contact and a second connection portion 18 for connecting the signal contacts 12 to a respective wire 20 of a cable 22. Each of the first connection portions 16 is formed as a tube having a first center axis 98. Alternatively, the first connection portions 16 can comprise a solid pin welded into a stamped and rolled rear section to form male signal contacts. Each of the second connection portions 18 define a second center axis 100 where a center axis of the cable is placed at. A distance A between the center axes 98 of the first connection portions 16 is larger than a distance B between the center axes 100 of the second connection portions 18. Alternatively, a distance between the center axes of the first connection portions can be smaller than a distance between the center axes of the second connection portions. In other words, the inner signal contacts 12 are formed so that a pitch translation is generated.

Each of the two inner signal contacts 12 are formed so that the first center axis 98 is spaced apart in parallel from the second center axis 100. In order to achieve this feature, sections 102 of the inner signal contacts 12 extend into a direction oblique to the axial direction 14. For example, the sections 102 can be formed by flat sheet metal or by a tube-shaped cross section. FIG. 11B depicts the inner signal contacts 12 inserted in the insulating element 28*a* of FIG. 2A.

Figure 12A:
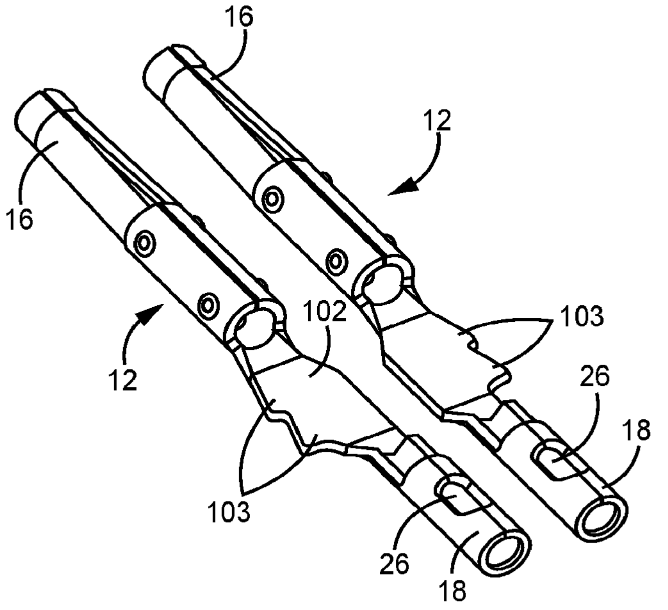
FIG. 12A is a perspective view of inner signal contacts according to a second embodiment.
Figure 12B:
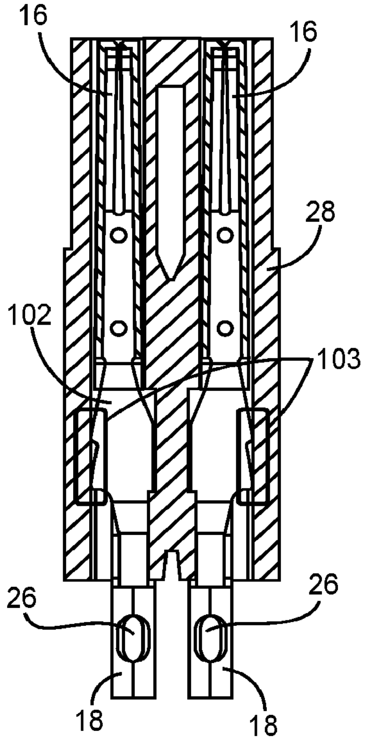
FIG. 12B is a sectional top view of the inner signal contacts of FIG. 12A surrounded by a respective insulating element.

FIGS. 12A and 12B depict inner signal contacts 12 according to a second embodiment. The inner signal contacts 12 differ from the inner signal contacts 12 of FIGS. 11A and 11B in that hooks 103 are formed at side surfaces of the flat sections 102. Hence, the inner signal contacts 12 can be inserted into an insulating element 28 as shown in FIG. 12B and FIG. 3 and can be axially fixated by the hooks 103. Furthermore, in the second connection portions 18 of the inner signal contacts 12, welding openings 26 are formed at an upper side so that the inner signal contacts 12 can be easily connected to the wires 20 of the cable 22 via welding, e.g. laser or resistance welding. Alternatively, not shown crimping wings 24 can be formed at the second connection portions 18 so that the inner signal contacts 12 can be crimped onto the wires 20 of the cable 22.

Figure 13A:
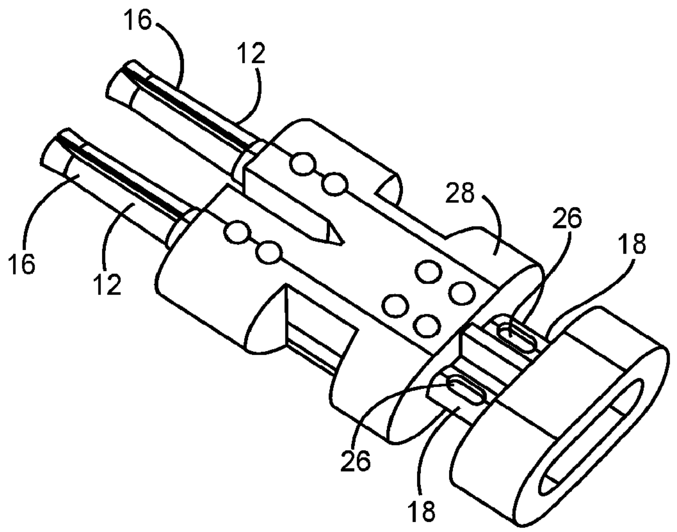
FIG. 13A is a perspective view of overmolded signal contacts.
Figure 13B:
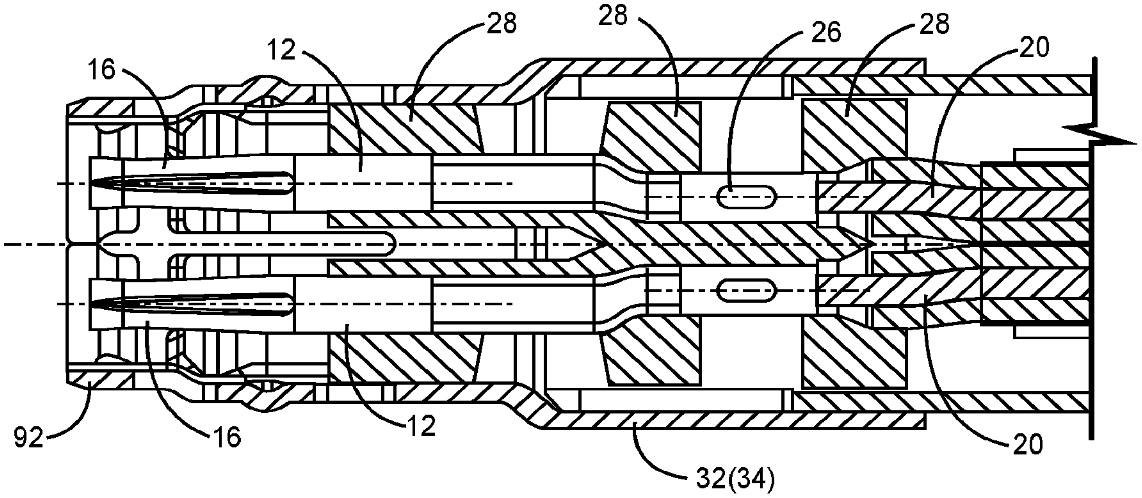
FIG. 13B is a sectional top view of the overmolded signal contacts of FIG. 13A placed in an outer shielding part.

FIGS. 13A and 13B depict the insulating element 28 according to another embodiment. Here, the insulating element 28 is manufactured by overmolding the inner signal contacts 12. In order to make sure that the mold does not enter into the tubular first and second connection portions 16, 18, the tubular portions are sealed during the molding process. Similarly, the welding openings 26 or crimping wings 24 are not overmolded to be able to connect the inner signal contacts 12 to wires 20 of the cable 22 later on.

Instead of overmolding both inner signal contacts 12 together, it is possible to overmold each inner signal contact 12 individually and later join the two inner signal contacts 12.

Figure 15:
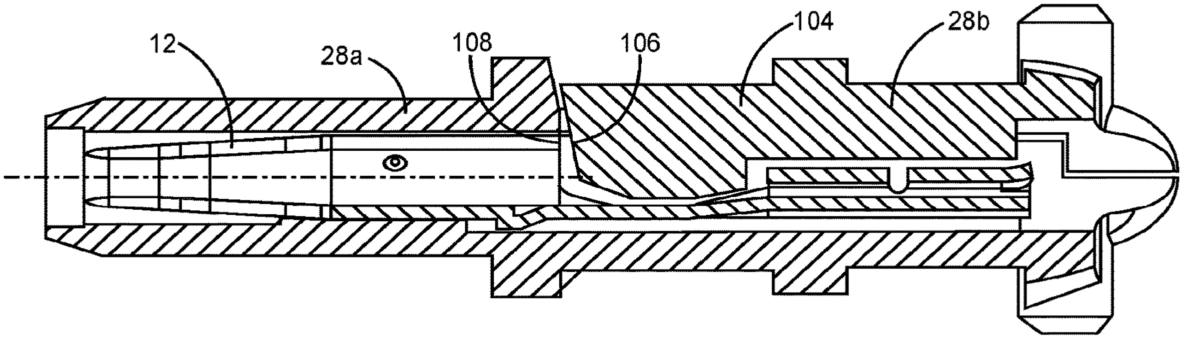
FIG. 15 is a sectional side view of a signal contact embedded in an insulating element according to a second embodiment.

FIGS. 14 and 15 depict two different possibilities on how to lock the inner signal contacts 12 in the insulating element 28. According to a first embodiment shown in FIG. 14, the insulating element 28 comprises a locking element 104 in form of an elastically deformable element which creates a snap fit connection between the inner signal contacts 12 and the insulating element 28 in the axial direction 14. The locking element 104 has a first locking surface 106 which comes into contact with a second locking surface 108 of the inner signal contacts 12 by snapping back from a deformed position into a neutral position in a radial direction. This embodiment allows manufacturing the insulating element 28 as a 1-piece part, e.g. by molding.

Contrary thereto, in the embodiment shown in FIG. 15, the locking element 104 is a solid part 28*b* which is not formed integrally with the remaining insulating element 28—as is shown in FIG. 14—, but instead, the insulating element 28 is made out of two separate parts 28*a*, 28*b* as is shown in FIG. 1. The second part 28*b* of the insulating element 28 functions as the locking element 104 and thus comprises the first locking surface 106 which comes into contact with the second locking surface 108 of the inner signal contacts 12, in particular when the connector 10 is plugged into a mating connector. Once the outer shielding contact 34 is assembled, the locking element 104 is blocked in position.

In general, the inner signal contacts 12 can be formed integrally from sheet metal. In order to manufacture the inner signal contacts 12 in a cost-efficient manner, the inner signal contacts 12 can be designed as stamped/bent parts.

With the above described connector 10, signal integrity can be improved by having less differential impedance mismatch, less long regions of differential impedance mismatch and less skew.

REFERENCE NUMERAL LIST

10 connector
12 inner signal contact
14 plug direction
16 first connection portion
18 second connection portion
20 wire
22 cable
24 crimping wing
26 welding opening
28 insulating element
30 first shielding part
32 second shielding part
34 shielding contact
36 distal end
38 shielding contact
38*a* first group
38*b* second group
40 proximal end
42 cover

44 crimping portion
44*a*, 44*b* crimp wing
45*a*, 45*b* peripheral end
46 wing
46*a*, 46*b* peripheral end
48 wing
48*a*, 48*b* peripheral end
50 inner shield
52 outer shield
54 cover
56 first cover part
58 second cover part
60 inner crimp ferrule
61 protection layer
62 shield layer (cable)
64 channel
66 connecting wing
68 blocking element
70 connecting wing
72 groove
74 gap
75 gap
76 welding position
77 rear edge
78 connector housing
80 terminal position assurance (TPA)
82 insulating layer
84 rib
86 quality control element
88 embossment
89 embossment
90 U-shaped portion
91 foil
92 distal ring element
94 contact point
96 outer crimping tube
98 center axis
100 center axis
102 section
103 hook
104 locking element
106 first locking surface
108 second locking surface

The invention claimed is:

1. A method of assembling a connector for automotive applications, the method comprising:

providing a cable having at least one inner conductor;

providing at least one elongated inner signal contact having at a first end at least a first connection portion and at a second end at least a second connection portion;

overmolding the at least one elongated inner signal contact with insulating material to form an insulating element that surrounds portions of the at least one elongated inner signal contact, wherein the insulating element is located on both sides of the second connection portion in an axial direction, wherein the second connection portion is not overmolded to allow access to the second connection portion;

connecting the second connection portion of the at least one elongated inner signal contact of the connector to a stripped end of the at least one inner conductor;

placing a first shielding part of the connector around a first portion of the insulating element from a first radial direction;

placing a second shielding part of the connector around a second portion of the insulating element from a second radial direction generally opposite to the first radial direction; and joining the first and second shielding parts to form a shielding contact of the connector surrounding the insulating element, wherein the at least one inner conductor is connected to the second connection portion of the at least one inner signal contact forming a tube, and wherein the second connection portion of the at least one inner signal contact has an opening along an outer surface of the tube to check whether the stripped end of the at least one inner conductor can be seen through the opening.

2. The method of claim 1, wherein the second connection portion of the at least one elongated inner signal contact is connected to the stripped end of the at least one inner conductor by one of crimping, welding, or laser welding.

3. The method of claim 1, wherein the second connection portion of the at least one elongated inner signal contact is welded to the stripped end of the at least one inner conductor via the opening along the outer surface of the tube.

4. A connector for automotive applications, the connector comprising:

at least one elongated inner signal contact having a first connection portion and a second connection portion, wherein the second connection portion is configured as a tube having a first opening at a distal end of the tube for receiving a wire;

an insulating element overmolded around the first connection portion of the at least one elongated inner signal contact, wherein the insulating element surrounds portions of the at least one elongated inner signal contact, wherein the insulating element is located on both sides of the second connection portion in an axial direction, wherein the second connection portion is not overmolded to allow access to the second connection portion;

a first shielding part; and a second shielding part, wherein the second connection portion of the at least one elongated inner signal contact has a second opening along an outer surface of the tube to check whether the wire can be seen through the opening.

5. The connector of claim 4, wherein the wire is welded to the the second connection portion via the first opening at the distal end of the tube.

* * * * *